United States Patent Office 3,294,724
Patented Dec. 27, 1966

3,294,724
FILM-FORMING URETHANE LATICES, AND PREPARATION BY CHAIN EXTENDING A PREPOLYMER OF AN ORGANIC DIISOCYANATE AND A POLYMERIC DIOL WITH A PIPERAZINE COMPOUND
Seymour L. Axelrood, Trenton, Mich., assignor to Wyandotte Chemicals Corporation, Wyandotte, Mich., a corporation of Michigan
No Drawing. Filed Nov. 23, 1964, Ser. No. 413,293
14 Claims. (Cl. 260—29.2)

This application is a continuation-in-part of application Serial No. 788,795, filed January 26, 1959, now abandoned.

The present invention relates to film-forming urethane latices and to the preparation thereof. More particularly, the invention relates to urethane latices which, when cast, form films with outstanding mechanical strength properties and to the preparation of these latices by the chain extension of linear polyurethane prepolymers.

Urethane latices are known in the art. Generally, these latices are coagulated and molded into useful elastomeric products. Numerous attempts to prepare films and coatings from urethane latices have failed for various reasons. Certain latices, upon casting and curing, are just not film-forming. Others, although they are film-forming, form films which crack upon drying and, thus, are obviously useless. (This cracking is generally referred to as "mud cracking.") Still others, although film-forming, do not form films of suitable mechanical strength properties for application in the coating industry. In summary, therefore, urethane latices had not heretofore been prepared which could be cast into films suitable for coating applications.

Now, in accordance with this invention, film-forming urethane latices may be prepared by the chain extension of linear polyurethane prepolymers with piperazine compounds. The linear polyurethane prepolymers are prepared by the reaction, in an equivalent ratio of NCO/OH of between about 1.33:1 to 2:1, of an organic diisocyante with a polymeric diol containing a branched polyoxyalkylene chain and having an average molecular weight of from about 400 to about 1500. The latices of this invention may be cast into films with mechanical strength properties which heretofore had not been obtained from cast urethane latex films.

The linear prepolymers which may be chain extended according to this invention are isocyanate-terminated prepolymers prepared by the reaction of selected diols with a stoichiometric excess of organic diisocyanates. Any of a wide variety of organic diisocyanates may be employed in this reaction, including aromatic, aliphatic and cycloaliphatic diisocyanates, and combinations thereof. Representative compounds include aromatic diisocyanates such as 2,4-tolylene diisocyanate, mixtures thereof with 2,6-tolylene diisocyanate (usually about 80/20), 4,4'-methylene-bis(phenylisocyanate), and m-phenylene diisocyanate. Aliphatic compounds such as tetramethylene diisocyanate and hexamethylene diisocyanate, and alicyclic compounds such as 1,4-cyclohexylene diisocyanates and 4,4'-methylene-bis(cyclohexylisocyanate) are also operable. Compounds such as 2,4-tolylene diisocyanate in which two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Additional diisocyanates which may be employed, for example, include p,p'-diphenylmethane diisocyanate, 3,3'-dimethyl-4,4'-biphenylene diisocyanate, 3,3'-dimethoxy-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate, and other diisocyanates in a blocked or semi-inactive form such as the bis-phenylcarbamates of tolylene diisocyanate, p,p'-diphenylmethane diisocyanate, p-phenylene diisocyanate, 1,5-naphthalene diisocyanate and 1,5-tetrahydronaphthalene diisocyanate.

Although not preferred, small amounts of polyisocyanates may be employed along with the diisocyanates in the preparation of the linear polymers utilized in this invention. Polyisocyanates may not be employed alone or in substantial quantities since their use promotes crosslinking in the preparation of the prepolymer. This crosslinking has a harmful effect on the mechanical property of films prepared upon casting latices prepared utilizing these prepolymers and, generally, impedes film-formation.

The polymeric diols which may be employed in the preparation of the linear prepolymers utilized in this invention are those diols containing a branched polyoxyalkylene chain and having an average molecular weight of from about 400 to about 1500. It is important that the hydroxyl-containing component of the prepolymers utilized in this invention be a polymeric diol since hydroxyl-containing components other than diols may introduce excessive cross-linking into the prepolymer chain and thus films cast from latices prepared from the prepolymers suffer from mud cracking and corresponding loss of strength properties. It is also important that the polymeric diols utilized in this invention have average molecular weights of from about 400 to about 1500. At average molecular weights above 1500, the strength of the films cast from latices prepared therewith begins to fall off considerably while at average molecular weights below 400 the latices are difficult to prepare and films cast therefrom have poor low-temperature flexibility. The preferred polymeric diols of this invention are those which have average molecular weights between about 475 and 675. Finally, the polymeric diols utilized in accordance with this invention must contain a branched polyoxyalkiene chain. Exemplary of this group include certain polyoxyalkylene glycols such as poly-1,2-oxypropylene glycol, poly-1,2-oxybutylene glycol, poly-1,3-oxybutylene glycol, polyoxyethylene poly-1,2-oxpropylene glycol, polyoxyethylene poly-1,2-oxybutylene glycol, polyoxyethylene poly1,3-oxybutylene glycol, poly-1,2-oxypropylene poly-1,2-oxybutylene glycol, poly-1,2-oxypropylene poly-1,3-oxybutylene glycol, certain polyalkylene arylene ether glycols such as the 1,2-propylene oxide addition products of Bisphenol A, 1,2-propylene oxide addition products of xylene diol; polyalkylene ether-polythio ether glycols, and alkylene oxide adducts of primary, secondary and tertiary aliphatic, cycloaliphatic, heterocyclic and aromatic amines such as the 1,2-propylene oxide adducts of ethyl amine, ethylene diamine, piperazine, 2-methylpiperazine, aniline and phenylene diamines. Preferred diols are the polyoxyalkylene glycols, particularly poly-1,2-oxypropylene glycol. Those polymeric polyoxyalkylene glycols which do not contain a branched chain such as polytetramethylene ether glycol and polytrimethylene ether glycol are not within the scope of this invention. Although not intended to be bound by theory, it appears that polymeric straight chain diols are too crystalline and/or their melting points are too high to yield satisfactory film-forming latices. Whatever the reason, the straight chain polymeric diols are not applicable in this invention.

In the preparation of the linear prepolymers which are utilized in this invention, the organic diisocyanate and the polymeric diol must be employed in amounts so that the NCO/OH equivalent ratio is between 1.33:1 to 2:1. At NCO/OH equivalent ratios greater than 2:1 or less than 1.33:1, film-forming latices are either not obtained or, if obtained, upon casting, the resulting films do not possess satisfactory mechanical strength properties.

The linear prepolymer is ordinarily prepared by heating the polymeric diol and the diisocyanate, with agitation, at a temperature of from about 50° C. to about 130° C., preferably 70° C. to 100° C. If a catalyst is employed, temperatures of from about 0° C. to about 60° C. are satisfactory. The reactants are heated for a period sufficient to react all the hydroxy groups whereafter the prepolymer is allowed to stand and the free NCO content determined. Generally, total reaction time will be from a period of from about two hours to about two days when a catalyst is not employed and a period of from about ten minutes to about three hours with a catalyst.

The reaction is preferably carried out, but not necessarily, in the presence of a solvent. If the prepolymer is a fluid at processing temperatures, it is possible to carry out the reaction in the absence of a solvent. Convenient solvents are organic solvents having a boiling range above 90° C. when the reaction is to be carried out in open equipment. Lower boiling solvents may, of course, be used where the reaction is carried out in closed equipment to prevent boiling off the solvent at the temperatures of the reaction. The solvent, when used, may be added at the beginning, at an intermediate point, or at the end of the prepolymer stage, or after cooling of the formed prepolymer. The solvents to be used are preferably those in which the reactants are soluble. Ketones, tertiary alcohols and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Hydrocarbon solvents such as toluene and benzene are preferred. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution; sometimes the excess solvent is useful and is allowed to remain during the emulsification stage.

Chain extension of the linear prepolymers occurs by adding the chain extending agent to the emulsified prepolymer in an aqueous reaction medium with good agitation. Preferably, the chain extending agent will be dissolved in water and added to the aqueous reaction medium which includes, along with the reaction product of the diisocyanate and the polymeric diol, a surfactant.

The chain extending agents which may be employed in accordance with this invention are those piperazine compounds containing only those two active hydrogen atoms attached to the two nitrogen atoms of the piperazine ring and being otherwise devoid of reactive groups, for example, piperazine compounds of the formula:

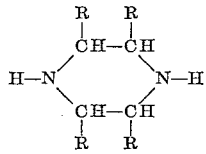

wherein R is selected from the group consisting of hydrogen and lower-alkyl, especially methyl. Representative piperazine compounds which may be employed are, for example, piperazine itself, C-substituted lower-alkyl piperazines, such as 2-methylpiperazine, 2-ethylpiperazine, 2-butylpiperazine, 2-hexylpiperazine, 2,5-dimethylpiperazine, 2,6-dimethylpiperazine, 2,3-dimethylpiperazine, and 2,3,5,6-tetramethylpiperazine. Of the piperazines which exist in stereoisomeric forms, such as 2,5-dimethylpiperazine, the cis form is preferred for processability and the trans form as lending superior tensile characteristics to the polyurethane-urea polymers incorporating same. In addition, compounds wherein a plurality of methyl or other alkyl groups are attached to a single carbon atom, such as 2,2-dimethylpiperazine or 2,2,5,5-tetramethylpiperazine, may be employed. The amount of piperazine compound used in the chain extension step is such that from about 0.8 to about 1.2 equivalents of piperazine compound are present in the chain extension reaction for each isocyanate equivalent in the isocyanate-terminated polyurethane starting prepolymer, preferably about 1.0 equivalent of piperazine compound for each isocyanate equivalent in the prepolymer.

According to the invention, latices are prepared by (1) the reaction of a polymeric diol with a stoichiometric excess of an organic diisocyanate, preferably in the presence of a solvent, (2) the emulsification of the prepolymer prepared as in (1) by combining it with an aqueous solution of a surfactant with vigorous agitation and (3) the chain extension of the emulsified prepolymer with a piperazine chain extender. The piperazine compound may be added directly or in the form of an aqueous solution or a solvent solution thereof. Preferably, the chain extender is added in an aqueous solution. The emulsifying agent may be added either to the initial reaction product or to the aqueous medium in which the reaction product is to be emulsified, or may be formed in situ during addition of the reaction product to the said medium.

The piperazine chain-extending agents utilized in accordance with this invention which are water-soluble, may be used in the form of solutions in producing these emulsions or latices since they react more readily with the isocyanate-terminated polyurethane prepolymer than does water itself. For the same reason, the prepolymer may be emulsified in water just prior to adding the chain-extending agent. The hydrogen on each end of the piperazine molecule reacts preferentially with the free isocyanate groups remaining in the initial polyurethane reaction product much more readily than does the hydrogen of the water, and therefore the chain is extended by reaction with the piperazine compound even though the reaction takes place in an aqueous medium.

The amount of water to be employed in the formation of the emulsion is not critical. When too small an amount of water is employed, emulsions are obtained which are too thick to handle readily while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols, quaternary ammonium salts, the tertiary amine or alkylol amine salts of long chain alkyl acid sulphate esters, alkyl sulphonic acids or alkyl aryl sulphonic acids or salts thereof; and alkali metal salts of high molecular weight organic acids. Nonionic agents such as polyoxyethylenepolyoxypropylene glycols, are preferred. The pH can then be regulated to a neutral value, preferably not above 7, to minimize any tendency toward hydrolysis. Salts of the high molecular weight organic acids may be used as emulsifying agents. One method of incorporating such salts is to mix the acid, e.g., tall oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From two percent to six percent of the emulsifying agent, based on the weight of the prepolymer employed, will usually be found sufficient to produce stable emulsions. When a fatty acid soap is used as the emulsifying agent, the soap must not be destroyed by acidic substances. The pH must, therefore, be maintained at least as high as that of an aqueous solution of the soap if stable latices are to be produced. For most fatty acid soaps, the pH should be at least nine, and for this reason soaps are not preferred. The small amount of carbon dioxide which may be formed by the chain extension of the isocyanate groups with water is acidic and uses up free alkali in the latex, so that an excess of alkali may be necessary to compensate for this. Preferably no alkali is added to the reaction, since some usually remains and causes deterioration of the polymer at elevated temperatures.

The chain extension step, while a relatively fast reaction when employing the piperazine chain extenders of the invention, may frequently be assisted by agitation of the emulsion for some time after its initial formation. This is usually accomplished by means of a conventional paddle type agitator at 30 to 90 r.p.m. or other conventional stirring equipment such as a Cowles dissolver, which aids in contacting the emulsion droplets with the chain extender.

EXAMPLES 1–23

Numerous latices were prepared by the general procedure which is given below. The details of each preparation and the physical properties of the film cast, if any, from the latices are given in Tables I–IV.

A. *Prepolymer formation*

A poly-1,2-oxypropylene glycol was charged to a reaction vessel with toluene and an organic diisocyanate. The charge was stirred for about three hours at 80° C. to 90° C. and after cooling, the free NCO content was determined. Additional toluene was then added to the reaction vessel to aid in the chain extension step which followed.

B. *Chain extension*

To 840 parts of the cooled prepolymer solution was added eighteen parts of a surface active agent consisting of dihydric polyoxyethylene polyoxypropylene having a molecular weight of about 16,000, a polyoxyethylene content of about 80 percent by weight, and a molecular weight of the polyoxypropylene base of about 3250 dissolved in 420 parts of water. The aqueous surfactant solution was cooled prior to its addition to the prepolymer solution and the addition occurred with good agitation in a "dispersator" mixer. The emulsion which was formed by the addition of the surfactant was passed through a homogenizer and with stirring a piperazine compound dissolved in cold water was added to form a stable chain-extended latex. After aging the latex three days, a film was cast on a glass plate and air dried overnight at 25° C., followed by fusing for ten minutes at 150° C. in an air circulating oven. The film, if formed, was stripped from the plate and the physical properties shown in Tables I–IV were obtained.

TABLE I.—475 MOLECULAR WEIGHT DIOL

| Example No. | Diisocyanate | NCO/OH Ratio | Chain Extender | Parts | Tensile, p.s.i. | Modulus, p.s.i., 300% | Modulus, p.s.i., 100% | Elongation, Percent | Split Tear, p.i. | Hardness, Shore A |
|---|---|---|---|---|---|---|---|---|---|---|
| 1 | TDI | 2:25/1 | 2-MP | 85.8 | NO FILM | | | | | |
| 2 | TDI | 2/1 | 2-MP | 58.5 | 6,970 | | | 5 | 300 | 99 |
| 3 | TDI | 1:75/1 | 2-MP | 39.2 | 7,840 | 6,560 | 3,150 | 320 | 550 | 97 |
| 4 | HDI | 1:75/1 | 2-MP | 39.2 | 2,512 | 335 | 200 | 750 | 70 | 45 |
| 5 | TDI | 1:50/1 | 2-MP | 26.5 | 6,650 | 4,150 | 1,615 | 425 | 415 | 90 |
| 6 | TDI | 1:33/1 | 2-MP | 17.1 | 5,250 | 1,315 | 380 | 490 | 250 | 88 |

TDI—Mixed isomers of tolylene diisocyanate (80/20; 2,4/2,6).
HDI—Hexamethylene diisocyanate.
2-MP—2-methylpiperazine.

TABLE II.—575 MOLECULAR WEIGHT DIOL

| Example No. | Diisocyanate | NCO/OH Ratio | Chain Extender | Parts | Tensile, p.s.i. | Modulus, p.s.i., 300% | Modulus, p.s.i., 100% | Elongation, Percent | Split Tear, p.i. | Hardness, Shore A |
|---|---|---|---|---|---|---|---|---|---|---|
| 7 | TDI | 1:75/1 | 2-MP | 33.7 | 7,150 | 5,150 | 1,920 | 375 | 405 | 83 |
| 8 | TDI | 1:50/1 | 2-MP | 23.8 | 5,490 | 1,285 | 420 | 500 | 210 | 64 |
| 9 | TDI | 1:33/1 | 2-MP | 15.2 | 4,415 | 760 | 370 | 640 | 115 | 51 |

TDI—Mixed isomers of tolylene diisocyanate (80/20; 2,4/2,6).
2-MP—2-methylpiperazine.

TABLE III.—675 MOLECULAR WEIGHT DIOL

| Example No. | Diisocyanate | NCO/OH Ratio | Chain Extender | Parts | Tensile, p.s.i. | Modulus, p.s.i., 300% | Modulus, p.s.i., 100% | Elongation, Percent | Split Tear, p.i. | Hardness, Shore A |
|---|---|---|---|---|---|---|---|---|---|---|
| 10 | TDI | 2:25/1 | 2-MP | 70.8 | NO FILM | | | | | |
| 11 | TDI | 2/1 | 2-MP | 47 | 6,385 | 4,355 | 2,373 | 350 | 565 | 90 |
| 12 | TDI | 2/1 | PIP | 40.4 | 8,770 | 4,455 | 1,838 | 405 | 680 | 89 |
| 13 | TDI | 1:75/1 | 2-MP | 38 | 6,715 | 2,680 | 775 | 420 | 215 | 68 |
| 14 | TDI | 1:75/1 | DMP | 43 | 5,236 | 2,906 | 1,122 | 423 | 225 | 66 |
| 15 | TDI | 1:75/1 | PIP | 32.4 | 6,810 | 2,750 | 910 | 410 | 240 | 69 |
| 16 | MDI | 1:75/1 | 2-MP | 26.5 | 5,095 | 4,760 | 1,395 | 315 | 310 | 75 |
| 17 | TDI | 1:50/1 | 2-MP | 41.7 | 4,955 | 630 | 280 | 560 | 130 | 55 |
| 18 | TDI | 1:33/1 | 2-MP | 16.2 | 3,320 | 270 | 160 | 770 | 70 | 48 |

TDI— Mixed isomers of tolylene diisocyanate (80/20; 2,4/2,6).
MDI—4,4'-methylene-bis(phenylisocyanate).
2-MP—2-methylpiperazine.
PIP—Piperazine.

TABLE IV

| Example No. | Mol. Weight Diol | Diisocyanate | NCO/OH Ratio | Chain Extender | Parts | Tensile, p.s.i. | Modulus, p.s.i., 300% | Modulus, p.s.i., 100% | Elongation, Percent | Split Tear, p.i. | Hardness, Shore A |
|---|---|---|---|---|---|---|---|---|---|---|---|
| 19 | 1,050 | TDI | 2:25/1 | 2-MP | 52.4 | NO FILM | | | | | |
| 20 | 1,050 | TDI | 2/1 | 2-MP | 35.2 | 4,412 | 1,127 | 409 | 530 | 107 | 72 |
| 21 | 1,050 | TDI | 1:75/1 | DMP | 31.2 | 2,472 | 665 | 286 | 595 | 98 | 65 |
| 22 | 1,575 | TDI | 2/1 | 2-MP | 25.4 | 2,050 | 600 | 210 | 850 | 59 | 50 |
| 23 | 1,200 | TDI | 2/1 | 2-MP | 31.9 | 3,854 | 766 | 346 | 650 | 82 | 60 |

TDI—Mixed isomers of tolylene diisocyanate (80/20; 2,4/2,6).
2-MP—2-methylpiperazine.
DMP—Trans 2,5-dimethylpiperazine.

EXAMPLE 24

A. Prepolymer formation

Mixed were 7475 parts of urethane grade dihydric polyoxyethylene poly-1,2-oxypropylenes, having a molecular weight of about 1065, a polyoxyethylene content of about 15 percent by weight, and a molecular weight of the polyoxypropylene base of about 940, and 2393 parts of tolylene diisocyanate isomers (80/20; 2,4/2,6). The NCO/OH mole ratio was 2.0. The mixture was then heated at 120° C. for three hours. At the end of this time, the free isocyanate content was 5.37 percent.

B. Chain extension

In 40 parts of toluene, 100 parts of this isocyanate-terminated prepolymer was dissolved and the solution emulsified in a solution of six parts of surface active agent, consisting of dihydric polyoxyethylene polyoxypropylenes, having a molecular weight of about 10,000 a polyoxyethylene content of about 80 percent by weight, and a molecular weight of the polyoxypropylene base of about 2250, in 100 parts of water. After one minute, a solution of 5.5 parts of piperazine in 25 parts of water was added to the emulsion with stirring. A stable suspension of polyurethane-urea polymer resulted. A film was cast with outstanding mechanical strength properties.

EXAMPLE 25

A. Prepolymer formation

Mixed were 4800 parts of polyoxypropylene glycol of molecular weight averaging 400 and 3200 parts of tolylene diisocyanate isomers (80 percent 2,4- and 20 percent 2,6-tolylene diisocyanate). The NCO/OH mole ratio was 1.60. The mixture was heated at 100° C. to 110° C. for three hours. The prepolymer thus formed was too viscous to flow at room temperature. The free isocyanate content was 6.15 percent.

B. Chain extension

Twenty parts of toluene and 35 parts of cyclohexanone were dissolved in 100 parts of this isocyanate-terminated prepolymer and the solution was emulsified in a solution of 6.6 parts of a surface active agent, consisting of dihydric polyoxyethylene polyoxypropylenes having a molecular weight of about 10,000, a polyoxyethylene content of about 80 percent by weight, and a molecular weight of the polyoxypropylene base of about 2250, in 110 parts of water. Stirring at 15,000 r.p.m. was employed in this operation. After one minute, a solution of 7.3 parts of 2-methylpiperazine in 25 parts of water was stirred into the emulsion. A film was cast with outstanding mechanical strength properties.

EXAMPLE 26

Following the general procedure of the above examples, polytetramethylene ether glycol of molecular weight of 1000 was utilized in the preparation of a prepolymer by the reaction thereof with tolylene diisocyanate in an NCO/OH ratio of 2.09:1. At the first addition of the piperazine chain extender (trans-2,5-dimethylpiperazine), coagulation of the latex occurred. No film could be cast from the latex. This example was carried out several times at several NCO/OH ratios with various molecular weight polytetramethylene ether glycols and with various piperazine compounds. No satisfactory film-forming latex could be prepared using the procedures set forth.

EXAMPLE 27

Following the general procedure described in Example 1, a propylene oxide adduct of Bisphenol A of molecular weight averaging 675 was utilized in the preparation of a prepolymer by the reaction thereof with tolylene diisocyanate in an NCO/OH ratio of 1.5:1. 2-methylpiperazine was used to chain extend the prepolymer. A film cast from the resulting latex had the following properties:

Tensile strength, p.s.i. _____ 4632
Shore A hardness _____ 95
Modulus, p.s.i. 300% _____ 4391
Modulus, p.s.i. 100% _____ 3436
Elongation, percent _____ 325
Split tear, Pi. _____ 286

I claim:
1. A process for the preparation of film-forming urethane latices which comprises chain extending in the presence of water a linear polyurethane prepolymer prepared by the reaction, in an equivalent ratio of NCO/OH of from 1.33:1 to 2:1, of an organic diisocyanate with a polymeric diol containing a branched polyoxyalkylene chain and having an average molecular weight of from about 400 to about 1500, with from about 0.8 to about 1.2 equivalents, for each isocyanate equivalent of said polyurethane prepolymer, of a piperazine compound having the formula:

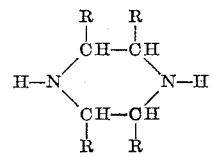

wherein R is hydrogen or lower alkyl.

2. The process of claim 1 wherein the average molecular weight of the diol is from about 475 to about 675.

3. The process of claim 1 wherein the polymeric diol is poly-1,2-oxypropylene glycol.

4. The process of claim 1 wherein the polymeric diol is poly-1,2-oxypropylene polyoxyethylene glycol.

5. The process of claim 1 wherein the piperazine compound is 2-methylpiperazine.

6. The process of claim 1 wherein the piperazine compound is piperazine.

7. The process of claim 1 wherein the organic diisocyanate is tolylene diisocyanate.

8. Film-forming urethane latices prepared by the chain extension in the presence of water of a linear polyurethane prepolymer prepared by the reaction in an equivalent ratio of NCO/OH of from 1.33:1 to 2:1 of an organic diisocyanate with a polymeric diol containing a branched polyoxyalkylene chain and having an average molecular weight of from about 400 to about 1500, with from about 0.8 to about 1.2 equivalents, for each isocyanate equivalent of said polyurethane prepolymer, of a piperazine compound having the formula:

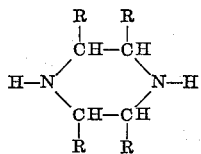

wherein R is hydrogen or lower alkyl.

9. The latex of claim 8 wherein the average molecular weight of the diol is from about 475 to about 675.

10. The latex of claim 8 wherein the polymeric diol is poly-1,2-oxypropylene glycol.

11. The latex of claim 8 wherein the polymeric diol is poly-1,2-oxypropylene polyoxyethylene glycol.

12. The latex of claim 8 wherein the piperazine compound is 2-methylpiperazine.

13. The latex of claim 8 wherein the piperazine compound is piperazine.

14. The latex of claim 8 wherein the organic diisocyanate is tolylene diisocyanate.

References Cited by the Examiner
UNITED STATES PATENTS

| | | | |
|---|---|---|---|
| 2,813,775 | 11/1957 | Steuber | 260—77.5 |
| 2,929,800 | 3/1960 | Hill | 260—77.5 |
| 2,929,803 | 3/1960 | Frazer et al. | 260—77.5 |
| 2,949,431 | 8/1960 | Britain | 260—77.5 |
| 2,968,575 | 1/1961 | Mallonee | 260—29.2 |

MURRAY TILLMAN, *Primary Examiner.*

J. C. BLEUTGE, *Assistant Examiner.*